United States Patent
Borroni-Bird et al.

(10) Patent No.: US 7,344,200 B2
(45) Date of Patent: Mar. 18, 2008

(54) VEHICLE BRAKING SYSTEM

(75) Inventors: Christopher E. Borroni-Bird, Oakland Township, MI (US); Sanjeev M. Naik, Troy, MI (US); Joseph F. Szczerba, Grand Blanc, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/888,489

(22) Filed: Jul. 9, 2004

(65) Prior Publication Data

US 2005/0023886 A1 Feb. 3, 2005

Related U.S. Application Data

(60) Provisional application No. 60/488,043, filed on Jul. 17, 2003.

(51) Int. Cl.
*B60T 13/70* (2006.01)

(52) U.S. Cl. .............................. 303/15; 303/3; 303/193; 303/166

(58) Field of Classification Search .................... 303/3, 303/191, 193, 122, 166, 125, 15; 701/70, 701/71; 188/106 R; 180/178, 78
See application file for complete search history.

(56) References Cited

U.S. PATENT DOCUMENTS

| | | | |
|---|---|---|---|
| 4,070,927 A | 1/1978 | Polak | |
| 4,077,487 A * | 3/1978 | Misinchuk | 180/78 |
| 5,234,071 A * | 8/1993 | Kajiwara | 180/169 |
| 5,601,506 A | 2/1997 | Long et al. | |
| 6,017,101 A * | 1/2000 | Matsuda | 303/140 |
| 6,292,753 B1 * | 9/2001 | Sugimoto et al. | 701/301 |
| 6,424,900 B2 | 7/2002 | Murray et al. | |
| 6,997,281 B2 * | 2/2006 | Chernoff et al. | 180/333 |
| 2003/0067219 A1 * | 4/2003 | Seto et al. | 303/193 |
| 2003/0132666 A1 * | 7/2003 | Bond et al. | 303/193 |
| 2003/0227217 A1 * | 12/2003 | Yoshizawa et al. | 303/193 |
| 2004/0073367 A1 | 4/2004 | Altan et al. | |
| 2004/0135431 A1 * | 7/2004 | Sekine | 303/140 |

* cited by examiner

*Primary Examiner*—Robert A. Siconolfi
*Assistant Examiner*—Mariano Sy

(57) ABSTRACT

A vehicle braking system has two driver-operable input devices. The vehicle braking system is sufficiently configured such that one of the driver-operable input devices is effective in causing resistance to the rotation of at least one wheel only when a predetermined condition exists, and the other driver-operable input device is effective independent of the predetermined condition.

16 Claims, 4 Drawing Sheets

VEHICLE BRAKING SYSTEM

CROSS REFERENCE TO RELATED APPLICATION

This invention claims the benefit of U.S. patent application No. 60/488,043, filed Jul. 17, 2003, and which is hereby incorporated by reference in its entirety.

TECHNICAL FIELD

This invention relates to vehicle braking systems having a first driver-operable input device and a second driver-operable input device, the first input device being effective only when a predetermined condition exists, and the second input device being effective independent of the predetermined condition.

BACKGROUND OF THE INVENTION

In a typical brake-by-wire system, a driver-operable braking system input device employs transducers to convert mechanical input by a driver into electrical signals indicative of driver intent. The electrical signals are interpreted by a controller in accordance with the controller's programming or software. The controller generates a signal which is transmitted to an actuator. The actuator produces a predetermined mechanical response to the signal from the controller, which results in resistance to the rotation of at least one vehicle wheel.

SUMMARY OF THE INVENTION

A braking system for a vehicle includes an actuator configured to selectively generate a predetermined mechanical response for causing resistance to the rotation of a wheel. A first driver-operable input device is effective to cause the actuator to generate the predetermined mechanical response only when one or more predetermined conditions exist. A second driver-operable input device is effective to cause the actuator to generate the predetermined mechanical response irrespective of the presence of the one or more predetermined conditions.

The first input device is preferably a foot pedal, and the second input device is preferably a hand operated device such as a pressure transducer inside a steering wheel cover. The invention thus enables a hand-operated brake input device adjacent to a driver's hands that is effective in braking the vehicle only during limited circumstances to reduce the possibility of inadvertent brake actuation.

The predetermined conditions preferably include conditions that are indicative of an elevated risk of vehicle collision and conditions that are indicative of stop-and-go driving.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
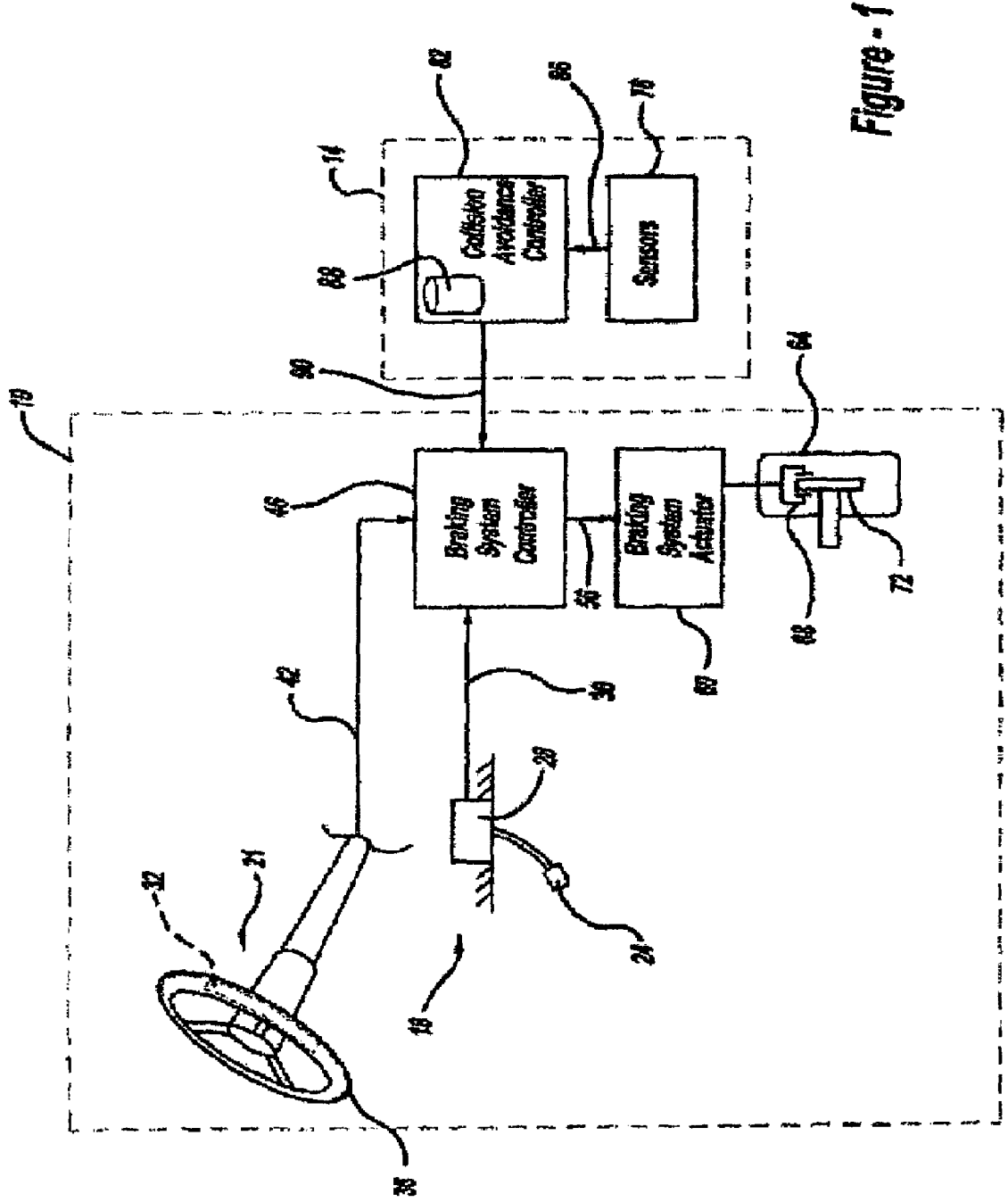
FIG. 1 is a schematic depiction of a braking system operatively connected to a collision avoidance system for use in a vehicle.

Referring to FIG. 1, a vehicle 10 includes a by-wire braking system 14, a collision avoidance system 18, a propulsion system 22, and a driving conditions determination system 26 (DCDS). The braking system 14 includes two driver-operable braking system input devices 30, 34. The input devices 30, 34 are part of a human/vehicle interface and convert the mechanical input of a driver into electrical signals indicative of driver intent. Input device 30 includes a brake foot pedal 38 operatively connected to a transducer 42 that converts mechanical control signals from the driver to electrical control signals 46. The transducer 42 employs various sensors to measure, and generate signals 46 indicative of, the position of the brake pedal 38, the force exerted against the brake pedal 38 and the velocity of brake pedal movement.

Input device 34 is hand-operated, that is, it is configured and positioned such that a vehicle driver in a driving position can access and operate the input device 34 with a hand, rather than with a foot. In the embodiment depicted, input device 34 includes a pressure transducer 50 inside the cover of a steering wheel 54 that converts mechanical input of the driver (in the form of pressure exerted on the steering wheel) to electrical control signals 58. The pressure transducer 50 transmits signals 58 to a braking system controller 62. The pressure transducer 50 in the embodiment depicted extends along only a portion of the steering wheel circumference; however, it may be desirable for the pressure transducer 50 to extend along all or substantially all of the steering wheel circumference. Other hand-operated input devices may be employed within the scope of the claimed invention. For example, the input device 34 may include a movable member adjacent the rim of the steering wheel 54, and may include a transducer to measure displacement of the member. Similarly, the input device 34 may include a movable stalk supported by, and extending from, a steering column. Examples of other hand-operated braking input devices that may be employed within the scope of the claimed invention are described in commonly-assigned U.S. patent application Ser. No. 10/675,835, filed Sep. 30, 2003, which is hereby incorporated by reference in its entirety.

The braking system controller 62 is configured to process signals 46, 58 according to a predetermined algorithm, and generate actuator control signals 66 in accordance with the algorithm. Actuator control signals 66 are transmitted to a braking system actuator 70 which is configured to generate a predetermined mechanical response to the actuator control signals 66.

Those skilled in the art will recognize a variety of braking system actuators that may be employed within the scope of the claimed invention. For example, the braking system actuator 70 may be an electro-hydraulic actuator, a servomotor, a solenoid, etc. The braking system actuator 70 is operatively connected to a wheel 74 and selectively causes resistance to the rotation of the wheel 74 in response to actuator control signals 66 from the braking system controller 62. In the embodiment depicted, the braking system actuator is operatively connected to brake calipers 78 and selectively causes the calipers 78 to engage a brake rotor 82. Within the scope of the claimed invention, other brake configurations may be employed, such as the use of electric motors to act as actuators to cause resistance to wheel rotation in regenerative braking.

The braking system 14 in the preferred embodiment is "by-wire," i.e., electrically conductive paths such as wires or printed circuit boards interconnect the various components of the braking system and carry the control signals from the input devices to the controller 62, and from the controller 62 to the actuator 70. However, any braking system may be employed within the scope of the claimed invention. Those skilled in the art will also recognize a variety of techniques and media for transmitting and receiving signals between components, including mechanical and hydraulic connections, fiber optic signal transmission, wireless signal transmission, etc.

The propulsion system 22 includes an energy conversion system that converts stored energy, such as chemical energy stored as fuel, to mechanical energy to rotate wheel 74. In the embodiment depicted, the energy conversion system includes an internal combustion engine 86 coupled to an automatic transmission 90 via an input shaft 94. The automatic transmission 90 is coupled to the wheel 74 via an output shaft 98. Exemplary automatic transmissions are described in U.S. Pat. No. 4,070,927 issued Jan. 31, 1978 to Polak, and U.S. Pat. No. 5,601,506 issued Feb. 11, 1997 to Long et al, both of which are hereby incorporated by reference in their entireties.

A propulsion system input device 102 includes a foot pedal, i.e., an accelerator pedal 106, operatively connected to a transducer 110 that converts mechanical control signals from the driver to electrical control signals 114. The transducer 110 employs various sensors to measure, and generate signals 114 indicative of, the position of the accelerator pedal, the force exerted against the accelerator pedal, and the velocity of accelerator pedal movement. A powertrain controller 118 is configured to process the signals 114 from the transducer 110 according to a predetermined algorithm, and generate control signals 122 to which the engine 86 is responsive to generate torque and power. More specifically, the powertrain controller 118 generates signals 122 to which the engine is responsive to vary the position of the throttle (not shown) and, correspondingly, the power and torque output of the engine, based on various inputs to the powertrain controller including the signals from the transducer 110.

The powertrain controller 118 also generates control signals 126 to which the transmission 90 is responsive to establish one of a plurality of discrete speed ratios between the input shaft 94 and the output shaft 98. More specifically, the powertrain controller 118 generates signals 126 to which the transmission is responsive to vary the speed ratio between the input shaft and the output shaft.

The collision avoidance system 18 includes collision avoidance sensors 130 and a collision avoidance system controller 134. The sensors 130 monitor the vehicle environment and transmit signals 138 carrying sensor data describing vehicle environmental conditions to the collision avoidance system controller 134. The collision avoidance system controller 134 is programmed to analyze the sensor data from signals 138 to determine if one or more predetermined vehicle conditions indicative of an elevated risk of vehicle collision exist. The controller 134 includes a data storage medium 142 with stored data that the controller 134 uses to determine the presence or absence of the one or more predetermined conditions based on the sensor data. Those skilled in the art will recognize that the stored data may be in a multitude of forms within the scope of the claimed invention, such as relational databases, look-up tables, formulae, etc.

Those skilled in the art will recognize a variety of collision avoidance system 18 configurations that may be employed within the scope of the claimed invention. For example, sensors 130 may include radar sensors, video sensors, photoelectric sensors, etc. The collision avoidance system may also include radar transmitters (not shown).

The collision avoidance controller 134 is programmed and configured to generate a signal 146 indicative an elevated risk of vehicle collision when the controller 134 determines the existence of the one or more predetermined conditions. The signal 146 is transmitted to the braking system controller 62 and to the powertrain controller 118. An exemplary collision avoidance system is described in commonly assigned U.S. application Ser. No. 10/272,532, filed Oct. 15, 2002, and which is hereby incorporated by reference in its entirety.

The DCDS 26 includes sensors 150 configured to monitor the vehicle environment and transmit signals 154 carrying sensor data describing vehicle environmental conditions to a DCDS controller 158. The controller 158 is programmed to analyze the sensor data from signals 154 to determine if one or more predetermined vehicle conditions indicative of stop-and-go driving conditions exist. That is, the controller 158 determines whether it is likely that the vehicle 10 is in traffic conditions requiring alternating acceleration and deceleration of the vehicle above a predetermined frequency of occurrence. For example, stop-and-go driving conditions may be present if the vehicle accelerates by more than a predetermined amount and then decelerates by more than a predetermined amount more than a predetermined quantity of times within a predetermined duration of time.

The controller 158 includes a data storage medium 162 with stored data that the controller 158 uses to determine the presence or absence of the one or more predetermined conditions indicative of stop-and-go driving based on the sensor data from sensors 150. Those skilled in the art will recognize that the stored data may be in a multitude of forms within the scope of the claimed invention, such as relational databases, look-up tables, formulae, etc.

In an exemplary embodiment, the sensors 150 are global positioning system (GPS) sensors that determine the location of the vehicle 10, and the data stored in storage medium 162 comprises map information. The controller 158 compares the location of the vehicle with the map information to determine whether, for example, the vehicle 10 is in an area with a population density higher than a predetermined amount, or on a street with more than a predetermined quantity of intersections within a predetermined distance of one another at which the vehicle may be required to stop. Similarly, the controller may check whether the vehicle is located on an expressway at less than a predetermined vehicle velocity, which may indicate stop-and-go driving conditions.

In another exemplary embodiment, the sensors 150 are configured to retrieve real-time traffic information. For example, an off-board transmitter (not shown) may transmit information to the sensors 150 indicating traffic conditions at the vehicle's location. In yet another exemplary embodiment, the sensors 150 monitor the vehicle speed, and the controller 158 analyzes recent trends in the vehicle speed. Frequent starting and stopping or other frequent changes in acceleration may indicate that stop-and-go driving conditions exist.

In still another exemplary embodiment, the sensors 150 monitor the movement of the braking system input devices 30, 34 and the propulsion system input device 102. Frequent switching by a driver between braking system input devices 30, 34 and the propulsion system input device 102 is indicative of stop-and-go driving.

When the controller 158 determines that the at least one condition indicative of stop-and-go driving exists, the controller 158 transmits a signal 166 to the braking system controller 62.

The braking system 14 is configured such that the input device 34 on the steering wheel 54 is operable to cause vehicle braking, i.e., resistance to wheel rotation, only when one or more predetermined conditions exist. More specifically, the braking system controller 62 is programmed and configured to generate actuator control signals 66 in response to signals 58 from the input device 34 only when either the collision avoidance system controller 134 transmits signal 146 indicating an elevated risk of vehicle collision or the DCDS controller transmits signal 166 indicating the existence of stop-and-go driving conditions.

In other words, the input device 34 on the steering wheel 54 is operative to cause vehicle braking only when the collision avoidance system controller 134 determines that an elevated risk of vehicle collision exists based on sensors 130, or when the DCDS controller 158 determines that the vehicle is likely in a stop-and-go driving condition based on sensors 150. The efficacy of braking system input device 30 is independent of the one or more predetermined conditions.

In a preferred embodiment, the DCDS controller 158 also transmits signal 166 to an indicator 170. Indicator 170 is responsive to signal 166 to generate an indication 174 perceptible by a human vehicle driver to inform the driver that input device 34 is operable or will be operable in a predetermined amount of time. Those skilled in the art will recognize a variety of indicators that may be employed within the scope of the claimed invention. For example, the indicator 170 may be a light-emitting diode (LED) or a lamp to provide a visual indication, may be a speaker to provide a chime or other audible indication. Other indications may include display messages, symbols, tactile feedback, etc.

Furthermore, in the preferred embodiment, the propulsion input device transducer 110 transmits signals 114 to the braking system controller 62 to provide the braking system controller 62 with data describing the position of the accelerator pedal. The braking system controller 62 is programmed and configured to generate actuator control signals 66 in response to signals 58 from the input device 34 only if signals 114 indicate that the accelerator pedal 106 is not depressed and, accordingly, zero torque is commanded by the driver.

In the preferred embodiment, the collision avoidance controller 134 also transmits signal 146 to the powertrain controller 118. In response to signal 146, the powertrain controller is configured to cause the transmission 90 to downshift, i.e., cause the transmission 90 to change from a first speed ratio to a second speed ratio higher than the first speed ratio. The powertrain controller 118 is also configured to cause the engine 86 to reduce torque and power output, such as by closing the throttle plate, irrespective of accelerator pedal position or electronic propulsion system control signals 114, thereby disabling the accelerator pedal during an elevated risk of vehicle collision.

Within the scope of the claimed invention, one or more of the controllers 62, 118, 134, 158 may be combined. Thus, for example, a single controller may be configured to receive and process signals from transducers 42, 50, 110 and sensors 130, 150, and to generate signals 66, 122, 126.

Figure 2:
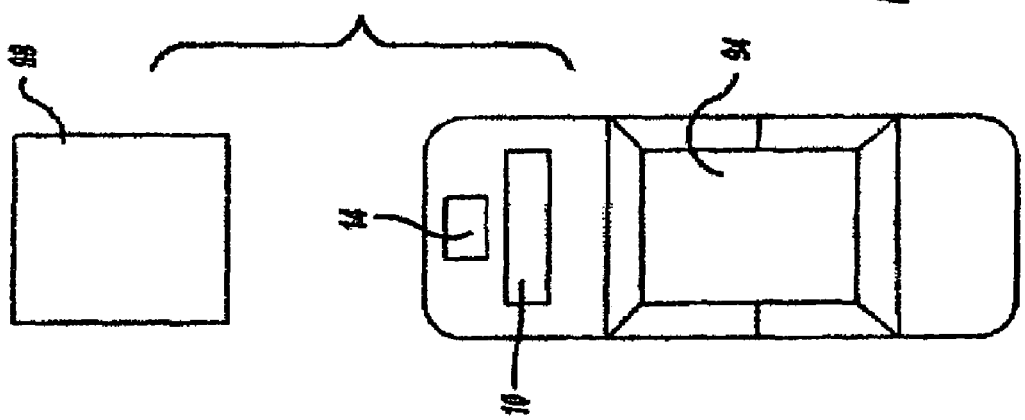
FIG. 2 is a schematic depiction of a vehicle having the braking system and collision avoidance system of FIG. 1 in a potential condition of elevated risk of collision with an object.

Referring to FIG. 2, wherein like reference numbers refer to like components from FIG. 1, the vehicle 10 includes the braking system 14, collision avoidance system 18, propulsion system 22, and DCDS 26 installed therein. The sensors 130 are configured to monitor two vehicle conditions, namely, the presence of an object 178 in the path of the vehicle 10, and the distance between the object 178 and the vehicle 10. The collision avoidance system controller is programmed to determine the rate of change thereof, i.e., the rate at which the distance between the vehicle 10 and the object 178 is decreasing. When the distance between the object 178 and the vehicle 10 is less than a predetermined amount, and the rate of change is above a predetermined amount, a predetermined condition is present and the collision avoidance system controller generates a signal indicative of an elevated risk of collision.

Figure 3:
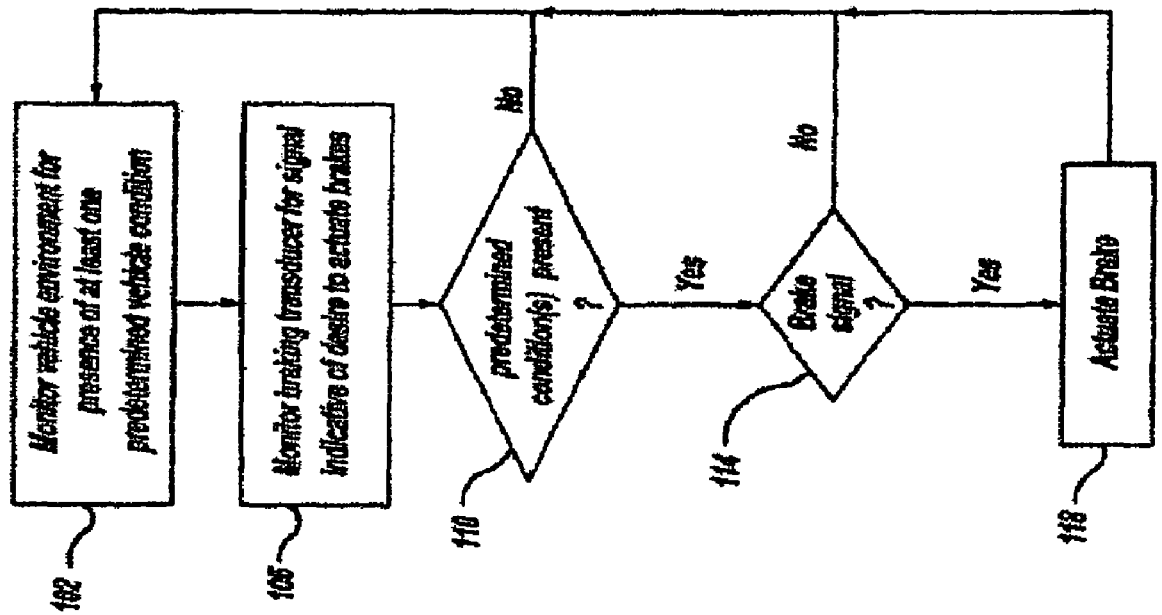
FIG. 3 is a flow chart of a method for selectively enabling a driver-operable braking system input device.

Referring to FIG. 3, a method for selectively enabling a driver-operable input device for a braking system is schematically depicted. The method represents an exemplary control logic for the combination braking system and collision avoidance system. The method includes monitoring a vehicle environment for the presence of at least one predetermined vehicle condition (step 182). The method also includes monitoring a driver-operable input device for a signal indicative of a driver desire to actuate brakes (step 186). The method also includes inquiring whether the at least one predetermined vehicle condition is present (step 190). If the answer is no, then the braking system controller does not respond to a signal from the input device, and accordingly, the input device is rendered ineffective in causing braking. If the answer to inquiry 190 is yes, then the input device is effective in causing braking. Accordingly, the next step is inquiring whether a signal indicative of a desire to actuate the brakes is present (step 194). If the answer is yes, then the method includes actuating a brake (step 198).

Figure 4:
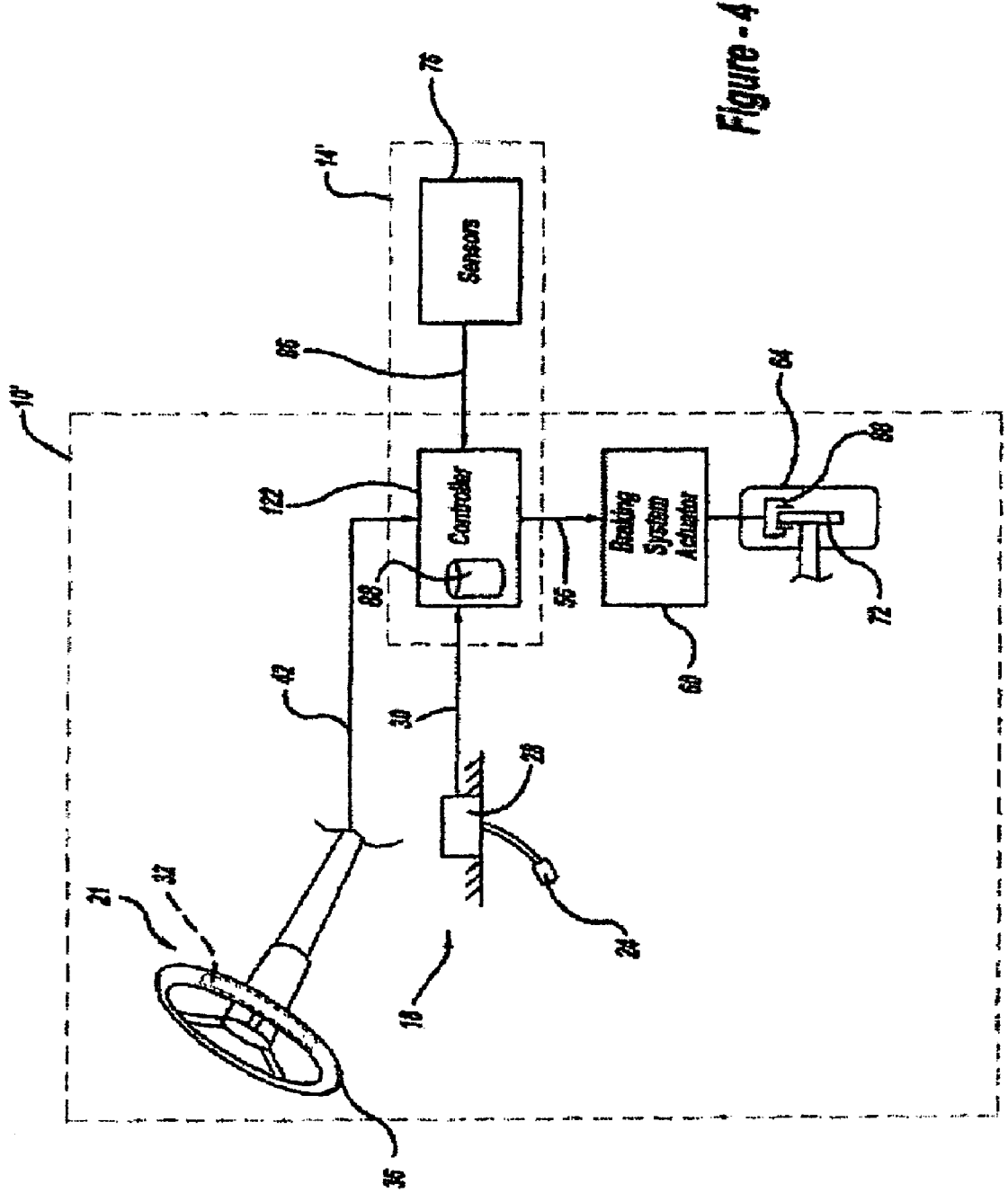
FIG. 4 is a flow chart of another method for selectively enabling a driver-operable braking system input device.

Referring to FIG. 4, another method for selectively enabling a vehicle braking system is depicted. The method of FIG. 4 represents another exemplary control logic for the vehicle of FIG. 1. The method includes monitoring vehicle conditions (step 182) for the presence or existence of at least one predetermined condition. The method also includes inquiring whether a first predetermined condition exists (step 202). In the preferred embodiment, the first predetermined condition is indicative of an elevated risk of vehicle collision. If the answer is yes, i.e., if the first predetermined condition exists, then the method includes disabling a propulsion system input device (step 206) such as an accelerator pedal to render the propulsion system input device ineffective in controlling a propulsion system; downshifting a transmission (step 210); and enabling a braking system input device (step 214) to make the braking system input device effective to selectively cause resistance to vehicle wheel rotation. In a preferred embodiment, the propulsion system input device is disabled by merely not responding to signals transmitted from the propulsion system input device. Similarly, the braking system input device is enabled, i.e., rendered effective, by responding to signals transmitted by the braking system input device, if present, to actuate brakes.

If the answer to inquiry 202 is no, then the method includes inquiring whether a second predetermined condition exists (step 218). In the preferred embodiment, the second predetermined condition is indicative of the vehicle being in a stop-and-go driving situation. If the answer is yes, then the method includes causing a perceptible indication of the enablement of the braking system input device (step 222) and inquiring whether the propulsion system input device is transmitting signals commanding energy conversion system torque or power (step 226). If so, then the braking system input device is not enabled. If the answer is no, then the method includes enabling the braking system input device (step 214). It should be noted that it may be desirable to generate a perceptible indication of the enablement of the braking system input device after determining the existence of the first predetermined condition at step 202.

If the first and second predetermined conditions are not present, then the method includes inquiring whether the braking input device is enabled (step 230), and if so, disabling the braking system input device (step 234) so that the input device is not effective in causing resistance to wheel rotation, such as by not responding to control signals from the input device. The method further includes inquiring whether the propulsion system input device is disabled (step 238) and, if so, enabling the propulsion system input device (step 242).

It may be desirable to indicate that the braking device is disabled, or inoperative in causing braking, if the first and second predetermined conditions are not present.

Figure 5:
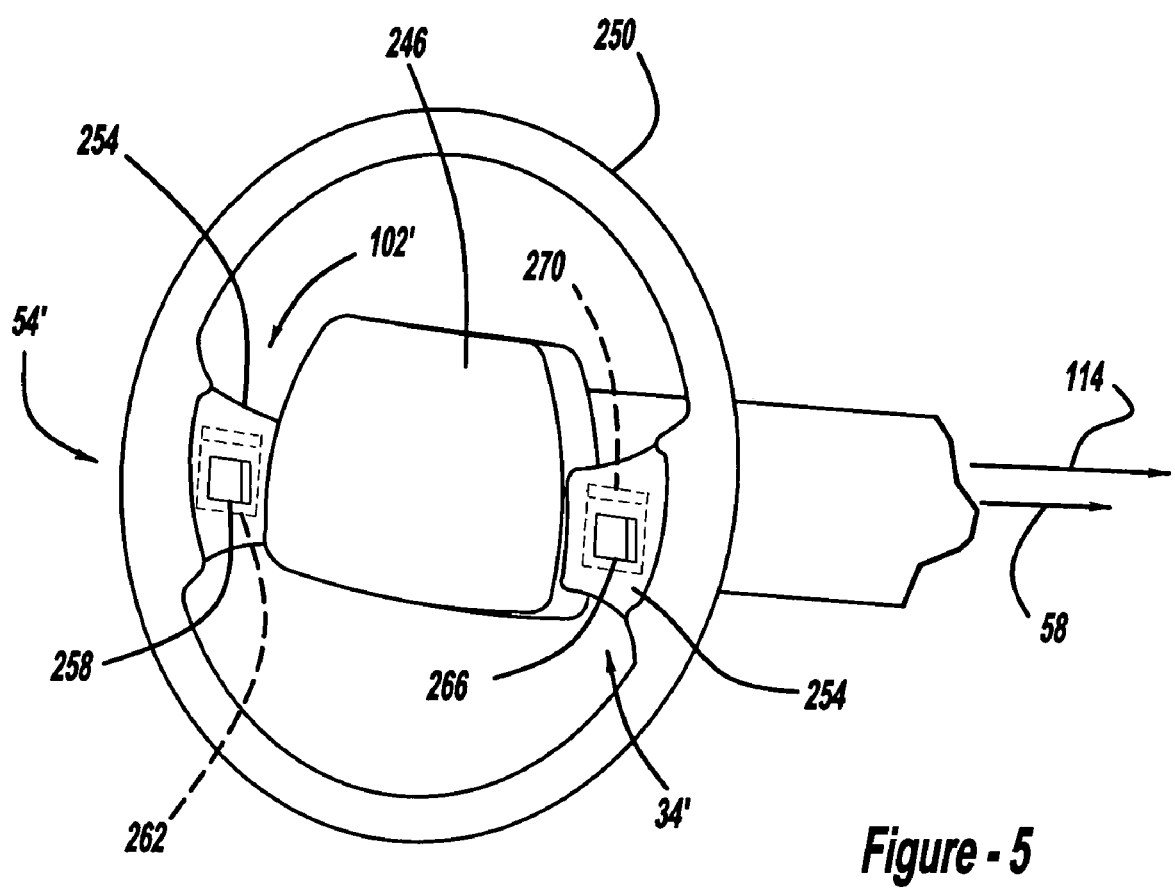
FIG. 5 is a schematic perspective view of an alternative steering wheel configuration including a propulsion system input device and a braking system input device for use with the vehicle of FIG. 1.

Referring to FIG. 5, wherein like reference numbers refer to like components from FIGS. 1 and 2, an alternative steering wheel assembly 54' for use with the vehicle of FIG. 1 is schematically depicted. The steering wheel assembly 54' includes a hub 246 and a rim 250 interconnected by a plurality of spokes 254. The steering wheel assembly 54' also includes a hand-operated propulsion system input device 102' that includes a push-button 258 and a transducer 262 configured to generate control signals 114 based on the position or movement of the push-button 258 for transmission to the powertrain controller (shown at 118 in FIG. 1). The steering wheel assembly 54' also includes an alternative hand-operated brake input device 34' including a push-button 266 and a transducer 270 configured to generate control signals 58 for transmission to the braking system controller (shown at 62 in FIG. 1). A hand-operated propulsion system input device 102' may be desirable for use in stop-and-go driving.

While the best modes for carrying out the invention have been described in detail, those familiar with the art to which this invention relates will recognize various alternative designs and embodiments for practicing the invention within the scope of the appended claims.

The invention claimed is:

1. A braking system for a vehicle comprising:
an actuator operatively connectable to a wheel and configured to selectively generate a predetermined mechanical response to cause resistance to the rotation of the wheel;
a hand-operable braking system input device effective to cause the actuator to generate the predetermined mechanical response only when at least one predetermined condition is satisfied, wherein said at least one predetermined condition is selected from the group of elevated risk of collision of said vehicle and stop-and-go traffic conditions;
a brake pedal effective to cause the actuator to generate the predetermined mechanical response irrespective of the satisfaction of said at least one predetermined condition;

a first controller;
a second controller;
a first system having sensors configured for monitoring an environment of said vehicle for the presence of an object in the path of said vehicle indicative of one of said at least one predetermined conditions, said first system being operable to transmit to said first controller a first set of signals related to said presence of said object;
a second system having sensors configured for monitoring an acceleration and a deceleration of said vehicle for determining the satisfaction of one of said at least one predetermined conditions, said second system being operable to transmit to said second controller a second set of signals related to said monitored acceleration and deceleration;
wherein at least one of said hand-operable braking system input device and said brake pedal is operable by-wire.

2. The vehicle braking system of claim 1, further comprising a steering wheel, and wherein the hand-operable braking system input device is on the steering wheel.

3. A vehicle comprising:
at least one wheel;
a braking system having a hand-operable braking system input device and a brake pedal, the braking system being configured to selectively cause resistance to rotation of said at least one wheel;
at least one controller;
a first sensor configured to monitor an acceleration and a deceleration of said vehicle;
a second sensor configured to detect the presence of an object in the path of said vehicle and the distance to said object;
wherein said first sensor is configured to transmit a first set of sensor signals related to said acceleration and said deceleration to said at least one controller, and wherein said second sensor is configured to transmit a second set of sensor signals related to the presence of said object and said distance to said at least one controller;
wherein said at least one controller is configured to determine whether said first set of sensor signals indicates the satisfaction of a first predetermined vehicle condition and whether said second set of sensor signals indicates the satisfaction of a second predetermined vehicle condition; and wherein the braking system is operatively connected to said at least one controller such that said hand-operable braking system input device is effective to cause resistance to the rotation of said at least one wheel only when said at least one controller determines that at least one of said first and said second predetermined conditions are satisfied, and said brake pedal is effective to cause resistance to the rotation of said at least one wheel irrespective of whether either of said first and said second predetermined conditions are satisfied;
wherein said braking system is operable by-wire, and wherein said first predetermined condition includes the presence of an elevated risk of vehicle collision based on said first set of sensor signals and wherein said second predetermined condition includes the presence of stop-and-go-driving conditions based on said second set of sensor signals.

4. The vehicle of claim 3, wherein the braking system further includes a braking system actuator; wherein the hand-operable braking system input device and the brake pedal are configured to transmit control signals to said at least one controller; wherein said at least one controller is operatively connected to the actuator to selectively cause the actuator to cause resistance to the rotation of said at least one wheel; and wherein said at least one controller is programmed to cause the actuator to cause resistance to the rotation of said at least one wheel in response to control signals from the hand-operable braking system input device only when said at least one controller determines the satisfaction of at least one of said first and said second predetermined vehicle conditions.

5. The vehicle of claim 3, further comprising a propulsion system including an energy conversion system configured to selectively provide torque to said at least one wheel, and a driver-operable propulsion system input device configured to generate control signals to which the energy conversion system is responsive to vary the amount of torque provided to said at least one wheel; and wherein said at least one controller is operatively connected to the propulsion system such that the propulsion system input device is ineffective to vary the torque provided by the energy conversion system when said at least one controller determines the satisfaction of at least one of said first and said second predetermined vehicle conditions.

6. The vehicle of claim 3, further comprising a propulsion system including a transmission having an input shaft and an output shaft, the output shaft being sufficiently configured to selectively transfer torque to said at least one wheel; wherein the transmission is configured to selectively establish a plurality of speed ratios between the input shaft and the output shaft; and wherein the transmission is operatively connected to said at least one controller such that the transmission downshifts from a first speed ratio to a second speed ratio higher than the first speed ratio when said at least one controller determines the satisfaction of at least one of said first and said second predetermined vehicle conditions.

7. The vehicle of claim 3, wherein said second predetermined vehicle condition is determined by sensing alternating vehicle acceleration and deceleration.

8. The vehicle of claim 7, further comprising a propulsion system including an energy conversion system configured to selectively provide torque to said at least one wheel, and a driver-operable propulsion system input device configured to selectively generate control signals indicating commanded torque to which the energy conversion system is responsive to vary the amount of torque provided to said at least one wheel; and wherein said at least one controller is operatively connected to the propulsion system such that the hand-operable braking system input device is effective to cause resistance to rotation of said at least one wheel only when said control signals indicate zero commanded torque.

9. The vehicle of claim 7, further comprising a propulsion system operatively connected to said at least one wheel; a steering wheel, and a hand-operable propulsion system input device on or adjacent to the steering wheel and configured to selectively generate propulsion system control signals to which the propulsion system is responsive.

10. The vehicle of claim 3, further comprising an indicator operatively connected to said at least one controller and configured to selectively generate a human-perceptible indication; and wherein said at least one controller is configured to cause the indicator to generate the indication when said at least one controller determines the satisfaction of at least one of said first and said second predetermined conditions.

11. A method comprising:
monitoring the operating environment of a vehicle for the presence or absence of a predetermined condition, the vehicle including a braking system having a hand-operable braking system input device and a brake pedal;
rendering an operation of the hand-operable braking system input device ineffective in causing resistance to the rotation of a wheel of said vehicle when said predetermined condition is not satisfied; and
wherein said braking system is operable by-wire, and wherein said at least one predetermined condition is selected from the group of an elevated risk of vehicle collision and stop-and-go-driving conditions.

12. The method of claim 11, further comprising rendering said operation of the hand-operable braking system input device effective in causing resistance to the rotation of a wheel of said vehicle when said predetermined condition is satisfied.

13. The method of claim 11, further comprising rendering an operation of a driver-operable propulsion system input device ineffective in varying a toque output of an engine of said vehicle when said at least one predetermined condition is satisfied.

14. The method of claim 11, further comprising downshifting a transmission when said at least one predetermined condition is satisfied.

15. The method of claim 11, further comprising causing a driver-perceptible indication when said at least one predetermined condition is satisfied.

16. The method of claim 11, further comprising rendering said operation of the hand-operable braking system input device effective in causing resistance to the rotation of a wheel of said vehicle when said predetermined condition is satisfied only if a propulsion system input device indicates zero commanded torque for a propulsion system.

* * * * *